United States Patent Office 3,265,757
Patented August 9, 1966

3,265,757
CATALYTIC HYDROLYSIS OF CARBONYL SULFIDE
Ludo K. Frevel, Midland, and Leonard J. Kressley, Saginaw, Mich., assignors to The Dow Chemical Company, Midland, Mich., a corporation of Delaware
No Drawing. Filed Sept. 11, 1964, Ser. No. 395,930
4 Claims. (Cl. 260—677)

This is a continuation-in-part of our copending application Serial Number 186,846, filed April 12, 1962.

This invention is concerned with a new and improved process for removing carbonyl sulfide from a liquid hydrocarbon carrier stream without the necessity of vaporizing such liquid stream. More particularly, this removal is accomplished by catalytically hydrolyzing the carbonyl sulfide in the presence of a particular form of active alumina.

Catalytic hydrolysis of carbonyl sulfide previously has been accomplished only in the gas phase. The problems encountered with handling large volumes of gas make such operations prohibitively cumbersome and expensive. Furthermore, it is frequently desirable to remove carbonyl sulfide directly from liquid substances without first evaporating and subsequently condensing since the resulting stream will usually be used in the liquid phase. For instance, wellhead petroleum, liquefied natural gases, and the like usually contain sufficient amounts of carbonyl sulfide to be deemed essentially valueless for most uses until carbonyl sulfide removal is effected. If a gas phase catalytic hydrolysis is required, as described in U.S. Patent 3,058,800, it is necessary that these liquid substances be vaporized, treated and then reliquefied.

It has been found in gas phase operations, that the activity of active alumina catalyst is generally affected by temperature. Usually a 10-degree centigrade temperature decrease in reaction temperature halves the rate of carbonyl sulfide hydrolysis. It would therefore be expected that the rate of carbonyl sulfide hydrolysis with an active alumina catalyst at the generally lower temperatures employed using the carrying hydrocarbon in the liquid state, would be prohibitively slow.

It is, therefore, a principal object of this invention to provide a method for removing carbonyl sulfide from liquid hydrocarbons. Other objects will become apparent hereinafter.

Unexpectedly, we have discovered that carbonyl sulfide may be hydrolyzed in liquid hydrocarbon at temperatures of from about 20 to about 50 degrees centigrade at excellent reaction rates, thereby obviating the problems inherent in gas phase operations.

In accordance with the present invention, a hydrocarbon carrying liquid containing from 0.1 p.p.m. (parts per million) to 35T p.p.m. of carbonyl sulfide (wherein T is the process temperature in degrees centigrade) and an amount of water from 0.3A to 12T p.p.m. (wherein A equals the carbonyl sulfide concentration by weight in p.p.m. in the hydrocarbon stream and wherein T is the process temperature in degrees centigrade) is contacted with a particular alumina catalyst, as more fully described hereinafter, at a temperature of from 20 to 50 degrees centigrade, thereby to hydrolyze said carbonyl sulfide. After the catalytic reaction, the carbon dioxide and hydrogen sulfide reaction products may be easily removed from the liquid hydrocarbon by conventional means.

Catalytic hydrolysis, according to the present invention, is carried out at temperatures of from about 20 to about 50 degrees centigrade and pressures sufficient to maintain the hydrocarbon in liquid state.

Hydrocarbons appropriate for use in the process of the present invention are the aliphatic hydrocarbons containing from two to four carbon atoms. Typical examples of aliphatic hydrocarbons suitable as liquid carriers in the process of this invention are: butadiene, butylene, ethane, propane, propylene, and the like, and mixtures thereof.

The particular active alumina catalyst necessary for catalytic hydrolysis of carbonyl sulfide is hereby defined and described for purposes of the claims as a high surface area (about 20 to 300 or more square meters per gram) alkaline, active alumina composition, said alkaline, active alumina composition having from about ½ to about 3 percent by weight of sodium or potassium atoms affixed thereto. Such catalyst may be prepared by numerous methods; illustratively, an aqueous solution containing aluminum salts may be treated with a dilute aqueous alkali solution containing either sodium or potassium ions until precipitation of the aluminum occurs. Thereafter, the precipitated alumina gel may be dried and roasted at temperatures from 250° C. to about 500° C. for several hours to insure essentially complete dehydration and activation.

According to the process of the present invention, hydrocarbon containing the carbonyl sulfide will be treated with amounts of water from about 0.3 times the COS concentration (in p.p.m.) to 12T p.p.m. (wherein T is the process temperature in degrees centigrade). Amounts of water in excess of 12T p.p.m. are undesirable. When less water than 0.3 times the COS concentration is used, incomplete reaction generally takes place resulting in a product which contains unreacted carbonyl sulfide. Preferably, the amount of water present in the carrying liquid is equimolar with the amount of carbonyl sulfide in the carrying liquid. Water employed in the present process must be ion-free water else the catalyst will be adversely affected.

When the catalyst is bone dry, hydrolysis does not usually take place. It is thus required, in start up, to provide sufficient water to at least moisten the catalyst. One method is to pass ion-free water and carbonyl sulfide-containing liquid hydrocarbon through the dry catalyst bed, discarding exit materials until sufficient water has built up on the catalyst to permit hydrolysis to begin. Another method of start up is to moisten the catalyst bed with ion-free water prior to starting flow of the water and carbonyl sulfide-containing liquid hydrocarbon. Using this procedure, hydrolysis begins immediately.

The procedural method in which carbonyl sulfide may be removed from liquid hydrocarbons depends upon many factors such as the particular liquid hydrocarbon, the amount of liquid hydrocarbon, the relative proportion of carbonyl sulfide in the liquid hydrocarbon, and the like. Usually, the liquid hydrocarbon containing carbonyl sulfide is passed through or over a bed of active alumina or positioned in a vessel containing active alumina. Surprisingly, it has been found that substantially all of the carbonyl sulfide may be catalytically hydrolyzed and removed from a carrying liquid when the concentration of the carbonyl sulfide is as high in p.p.m. as up to 35T (wherein T equals the process temperature in degrees centigrade). Further, the liquid hydrocarbon may be passed through or over the active alumina catalyst at a rate of about 6 volumes of liquid per volume of the catalyst per hour with surprising efficiency in the carbonyl sulfide hydrolysis. Throughout extended use of the active alumina, it has been found that the catalyst life is indefinite without noticeable loss of reactivity. Separation of the degraded carbonyl sulfide catalytic reaction products, i.e., carbon dioxide and hydrogen sulfide is accomplished in a conventional manner.

The following examples are given to more clearly describe the process, but are not to be construed as limiting the invention thereto.

Example 1

A cylindrical catalyst bed was prepared employing 8 mesh (U.S. Standard Sieve Series) active alumina, as hereinbefore defined, said bed having a height of 14 feet and a diameter of 42 inches. The bed and the feed stream were maintained at a temperature of about 32 degrees centigrade. Liquid propylene containing 49 p.p.m. of carbonyl sulfide was fed to the catalyst bed at a rate of 60 gallons per minute. Ion-free water was fed to the liquid propylene feed stream at the rate of 0.0104 gallon per minute thereby to provide the stream with 290 p.p.m. of water. Analysis of the product stream showed that there was less than 1 p.p.m. (the detection limits of the analysis) of carbonyl sulfide in the product.

In substantially the same manner, runs were made containing 25 and 18 p.p.m. carbonyl sulfide in the feed propylene stream with the same resulting carbonyl sulfide-free product.

Example 2

Employing substantially the same procedure as that outlined in Example 1, butadiene, butylene, ethane, propane and mixtures thereof, in the liquid state, may be substituted for propylene as the hydrocarbon containing carbonyl sulfide with substantially similar results.

Various modifications may be made in the present invention without departing from the spirit or scope thereof, and it is to be understood that we limit ourselves only as defined by the appended claims.

We claim:

1. A liquid phase process for the removal of carbonyl sulfide from hydrocarbons which comprises passing a liquid hydrocarbon having from 2 to 4 carbon atoms and containing carbonyl sulfide in a maximum amount of 35T p.p.m. (wherein T is the process temperature in degrees centigrade) and an amount of ion-free water of from 0.3A p.p.m. to 12T p.p.m. (wherein A equals the carbonyl sulfide concentration in the hydrocarbon and wherein T is the process temperature in degrees centigrade) over an alkaline, active alumina catalyst having from about 0.15 to about 3.0 percent by weight of sodium or potassium atoms attached thereto at a temperature of from 20 to 50° C. to thereby remove the carbonyl sulfide from said liquid hydrocarbon.

2. The process of claim 1 wherein said ion-free water is in equimolar proportions with said carbonyl sulfide.

3. A liquid phase process for the removal of carbonyl sulfide from hydrocarbons which comprises (1) contacting a liquid hydrocarbon having from 2 to 4 carbon atoms and containing carbonyl sulfide in a maximum amount of 35T p.p.m. (wherein T is the process temperature in degrees centigrade) with sufficient ion-free water to provide a water concentration in the liquid hydrocarbon of from about 0.3A p.p.m. to about 12T p.p.m. (wherein A equals the carbonyl sulfide concentration in the hydrocarbon and T is the process temperature in degrees centigrade) and (2) passing such mixture of liquid hydrocarbon, carbonyl sulfide and ion-free water over an alkaline active alumina catalyst having from about 0.15 to about 3.0 percent by weight of sodium or potassium atoms attached thereto at a temperature of from 20 to 50° C. at a pressure sufficient to maintain the hydrocarbon in the liquid state.

4. The process of claim 3 wherein the hydrocarbon is propylene.

References Cited by the Examiner

UNITED STATES PATENTS 3,058,800  10/1962  Frevet et al. _____ 260—677

ALPHONSO D. SULLIVAN, *Primary Examiner.*